(12) United States Patent
Ponce et al.

(10) Patent No.: US 11,756,260 B1
(45) Date of Patent: Sep. 12, 2023

(54) VISUALIZATION OF CONFIGURABLE THREE-DIMENSIONAL ENVIRONMENTS IN A VIRTUAL REALITY SYSTEM

(71) Applicants: Amanda Ponce, Pflugerville, TX (US); Enrique Moya, Pflugerville, TX (US)

(72) Inventors: Amanda Ponce, Pflugerville, TX (US); Enrique Moya, Pflugerville, TX (US)

( * ) Notice: Subject to any disclaimer, the term of this patent is extended or adjusted under 35 U.S.C. 154(b) by 0 days.

(21) Appl. No.: 17/586,173

(22) Filed: Jan. 27, 2022

(51) Int. Cl.
*G06T 15/20* (2011.01)
*G06T 7/73* (2017.01)

(52) U.S. Cl.
CPC ........... *G06T 15/20* (2013.01); *G06T 7/73* (2017.01); *G06T 2207/20092* (2013.01)

(58) Field of Classification Search
None
See application file for complete search history.

(56) References Cited

U.S. PATENT DOCUMENTS

| | | | |
|---|---|---|---|
| 2003/0179218 A1* | 9/2003 | Martins | G06T 19/00 345/633 |
| 2015/0116509 A1* | 4/2015 | Birkler | H04N 1/00233 348/207.1 |
| 2018/0144547 A1* | 5/2018 | Shakib | G06T 15/503 |
| 2019/0250802 A1* | 8/2019 | Schenck | G06F 3/011 |

* cited by examiner

*Primary Examiner* — Frank S Chen
(74) *Attorney, Agent, or Firm* — Leavitt Eldredge Law Firm

(57) ABSTRACT

Methods, systems, and apparatus, including computer programs encoded on a computer storage medium, for imaging scenes of three-dimensional (3-D) environments using a virtual reality system. A request to display a target three-dimensional environment in a virtual reality system is received. An image of a scene of the target three-dimensional environment is generated. The image of the scene includes features distributed within the scene of the target three-dimensional environment according to a distance from a viewing point of the scene of the target three-dimensional environment. A request to display a modified image of the scene of the target three-dimensional environment is received. The modified image of the scene of the target three-dimensional environment is generated by adding auxiliary data associated with the plurality of features relative to the distance from the viewing point of the scene of the target three-dimensional environment to each of the plurality of features.

18 Claims, 10 Drawing Sheets

VISUALIZATION OF CONFIGURABLE THREE-DIMENSIONAL ENVIRONMENTS IN A VIRTUAL REALITY SYSTEM

TECHNICAL FIELD

This application relates generally to a virtual reality system.

BACKGROUND

A typical way to view three-dimensional environments on a conventional device is to open an application that can display a portion of the three-dimensional environment on a display screen (e.g., a monitor of a computer, smartphone, tablet, etc.). A user can navigate to the application to view the content. Normally, when the user is looking at the display screen of the display, there is a fixed two-dimensional format as to how the three-dimensional environment is displayed within the application and on the display screen of the display device.

SUMMARY

Aspects of the present application relate to methods and apparatus for scalable three-dimensional (3-D) object recognition in a virtual reality (VR), augmented reality or cross reality system. Techniques as described herein can be used together, separately, or in any suitable combination.

In one aspect, this document describes a method for displaying a dynamically modified image of a scene of a target three-dimensional environment using a VR system. The method includes receiving a request to display a target three-dimensional environment in a virtual reality system. An image of a scene of the target three-dimensional environment is generated. The image includes a plurality of features distributed within the scene of the target three-dimensional environment according to a distance from a viewing point of the scene of the target three-dimensional environment. A request to display a modified image of the scene of the target three-dimensional environment is received. Auxiliary data associated with the plurality of features is retrieved. The modified image of the scene of the target three-dimensional environment is generated. The modified image includes the auxiliary data associated with the plurality of features adjusted relative to the distance from the viewing point of the scene of the target three-dimensional environment to each of the plurality of features. An output is provided to display the modified image of the scene of the target three-dimensional environment by a user device including the VR system.

In another aspect, this document describes a system for displaying a dynamically modified image of a scene of a target three-dimensional environment using a VR system. The system includes one or more computers; and one or more computer memory devices interoperably coupled with the one or more computers and having tangible, non-transitory, machine-readable media storing one or more instructions that, when executed by the one or more computers, perform various operations. The operations include receiving a request to display a target three-dimensional environment in a virtual reality system. An image of a scene of the target three-dimensional environment is generated. The image includes a plurality of features distributed within the scene of the target three-dimensional environment according to a distance from a viewing point of the scene of the target three-dimensional environment. A request to display a modified image of the scene of the target three-dimensional environment is received. Auxiliary data associated with the plurality of features is retrieved. The modified image of the scene of the target three-dimensional environment is generated. The modified image includes the auxiliary data associated with the plurality of features adjusted relative to the distance from the viewing point of the scene of the target three-dimensional environment to each of the plurality of features. An output is provided to display the modified image of the scene of the target three-dimensional environment by a user device including the VR system.

In another aspect, this document describes one or more non-transitory computer-readable storage devices coupled to one or more processors and having instructions stored thereon which, when executed by the one or more processors, cause the one or more processors to perform various operations. The operations include receiving a request to display a target three-dimensional environment in a virtual reality system. An image of a scene of the target three-dimensional environment is generated. The image includes a plurality of features distributed within the scene of the target three-dimensional environment according to a distance from a viewing point of the scene of the target three-dimensional environment. A request to display a modified image of the scene of the target three-dimensional environment is received. Auxiliary data associated with the plurality of features is retrieved. The modified image of the scene of the target three-dimensional environment is generated. The modified image includes the auxiliary data associated with the plurality of features adjusted relative to the distance from the viewing point of the scene of the target three-dimensional environment to each of the plurality of features. An output is provided to display the modified image of the scene of the target three-dimensional environment by a user device including the VR system.

Implementations of the above aspects can include one or more of the following features. The auxiliary data comprises a highlight of a respective feature includes an upgraded feature or a potentially upgradable feature. The highlight includes a strip surrounding the respective feature. The auxiliary data includes a color-coded layer of a respective feature indicating a lifespan of the respective feature. The color-coded layer includes a 3-D object mask of the respective feature. The operations can further include receiving an updated location request, determining an updated distance from an updated viewing point of the scene of the target three-dimensional environment to each of the plurality of features, and adjusting one or more characteristics of the auxiliary data based on updated distance from an updated viewing point of the scene of the target three-dimensional environment to each of the plurality of features.

The specification describes techniques for integrating dynamically adjusted auxiliary data, with color images and depth images of a virtual 3D environment to generate accurate and clear 3-D images of scenes even with poor depth information, e.g., scenes with black objects or reflective objects for which depth information tends to be missing, poor, or unreliable. The reconstructed model of the 3D environment can be transmitted to and displayed with high resolution by one or more types of user devices, including connected headsets configured to display 3D environments and mobile devices configured to provide a two dimensional projection of the 3D environments. Updates to the 3D environment can be transmitted between connected devices to automatically update the displays of these devices during a communication session.

By making use of the described techniques, a VR application can have more immersive experiences. For example, a virtual agent of an interactive presentation of a property can sit on one of the chairs that have been recognized in the 3D environment in order to provide a more immersive experience. The virtual agent can provide an audio description of the objects on which the user is focusing on or direct the user to observe additional objects. Spatial audio in a VR application can use the locations of the detected 3-D objects to properly reflect sounds depending on the category of each object.

In some implementations, the VR system can build, based on a filtered model of the 3D environment, a styled 3D environment highlighting upgrades that enhance analysis and evaluation of items within the 3D environment. In some implementations, the VR system can perform more robustly by making use of the location information of the detected 3-D objects. For example, tracking, localization or meshing computations can be more robust to long term dynamic changes, such as moving objects, by making use of the 3-D object detections.

The foregoing summary is provided by way of illustration and is not intended to be limiting.

DESCRIPTION OF THE DRAWINGS

The accompanying drawings are not intended to be drawn to scale. In the drawings, each identical or nearly identical component that is illustrated in various figures is represented by a like numeral. For purposes of clarity, not every component can be labeled in every drawing. In the drawings.

DETAILED DESCRIPTION

Figure 1:
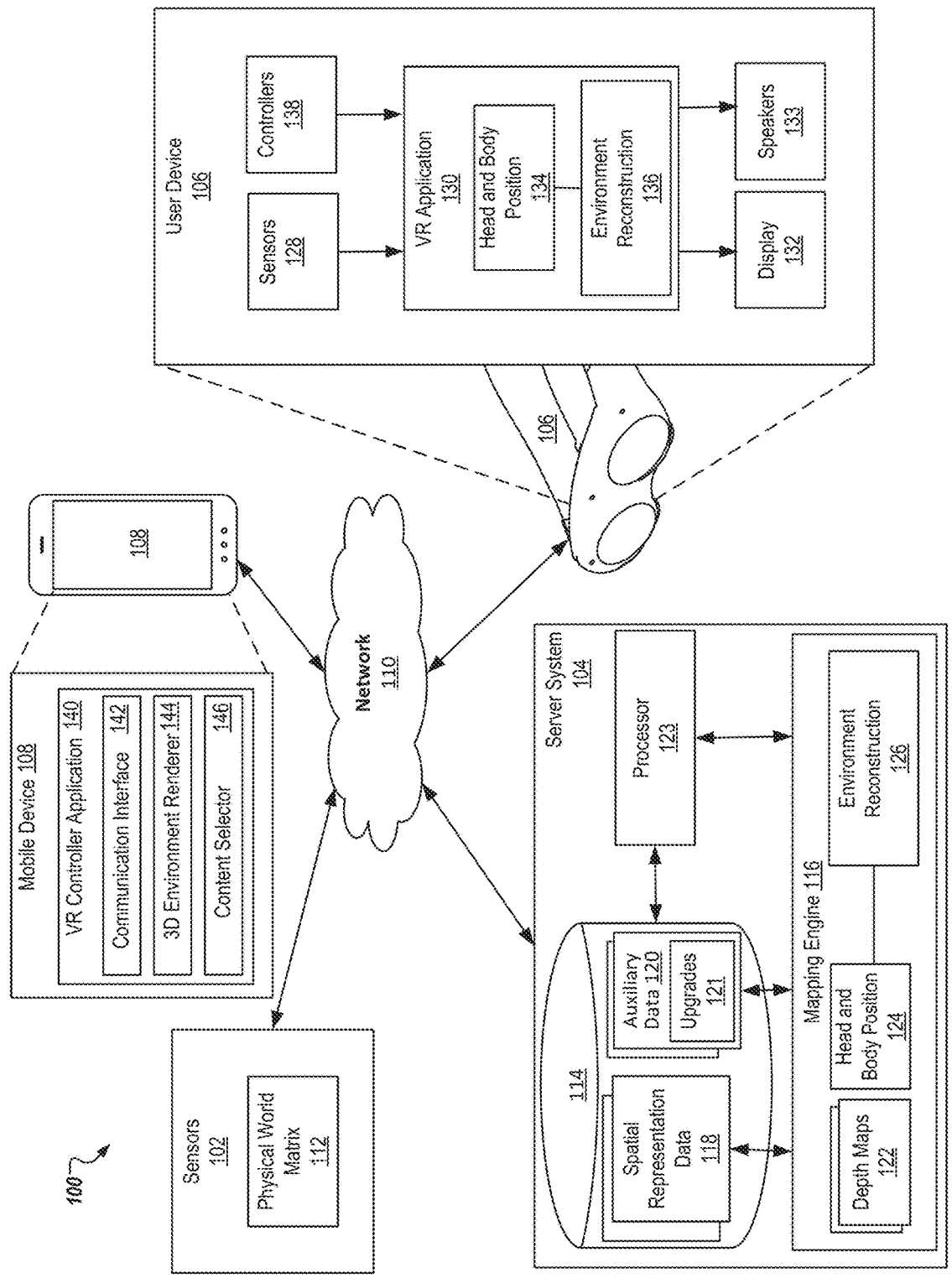
FIG. 1 is a schematic diagram illustrating an example architecture that can be used to execute implementations of the present disclosure.

Implementations of the present disclosure are generally directed to interactive display of configurable three-dimensional (3-D) environments using virtual reality (VR) visualization systems. In particular, described herein are methods and apparatus for interactively adjusting a display of 3D environments including scalable three-dimensional (3-D) objects to provide a guided exploration of the 3D environment to realistically and safely visualize them. For example, a VR system can use users' physical surroundings in order to enable safe navigation of virtual locations in relation to movement in a real environment while enabling identification and understanding of a property features highlighted or color-coded relative to particular values of the features included in the configurable 3D environment.

In an example context, a user can access a 3D visualization application to view a map of properties (e.g., houses, buildings, office areas, boats, event centers, shopping centers, transportation centers, etc.) that are for available (e.g., for sale or could be built) in a particular region of interest (e.g., within a given radius) around a point of interest (e.g., center of a city). The properties can be filtered based on one or more conditions (e.g., price range, number of beds, number of baths, amenities, house type, and house style). The user can select to view one property at a time, as the property is currently available or in an updated format (e.g., without furniture or decorated according to a selected style that is compatible with the target property). The user's movements (displacement) can trigger updates of the property display to mimic a virtual movement through the target property. A user input can be used to generate a movement through the property. In some implementations, the user can view the property in a mode that reflects a preferred style of the user. The preferred style property display can provide a visual assistance to regular users who have a strong preference for a house style, which could be implemented in an available property that is currently designed in a significantly different style, assisting regular users to evaluate property based on its full potential. In some implementations, the user can view the property in a mode that highlights the existent and/or the potential upgrades of the property. The highlights can provide a visual assistance to correlate the property characteristics to the property value, which is otherwise difficult to establish for regular users, who are not experts in the field. The user interface can enable a selection of preferred upgrades and dismissal of potential upgrades that are not of interest for the user. In some implementations, the user can view the property in a lifetime mode, which indicates through color-coded layers, the lifespan of each of the main features the property that appears in view. A value of the property can be updated in real time based on the selection of the preferred upgrades and based on an estimate of future cost of replacements relative to the lifespan of the property features. In some implementations, an offer to purchase a target property including the selection of the preferred upgrades can be generated for the user account. One or more secondary users (e.g., a system administrator, such as a realtor agent and/or a purchasing partner) can connect to the primary VR system using an additional VR system or using a mobile device to visualize the target property in parallel and/or to control one of more functions of the 3D visualization application.

Computers may control human user interfaces to create a VR environment in which some or all of the VR environment, as perceived by the user, is generated by the computer based on data collected, from an existent 3D physical environment, by one or more sensors. The VR environment can include an augmented reality (AR) environment and a mixed reality environment, in which some or all of a VR environment can be generated by computers using, in part, data that describes the environment. The data describing the environment can include, for example, virtual objects (properties and property features) that can be rendered in a way that users' sense or perceive as a part of a physical world and can interact with the virtual objects (e.g., applying a force to rearrange objects within the displayed environment or selecting a switch to display a feature, such as a light fixture, in a different state, such as on or off). The user can view these virtual objects as a result of the data being rendered and presented through a user interface device (e.g., a head-mounted display device) and the user can interact with the virtual objects using one or more controllers. The user interface device may display data to the user to see, while an audio presentation is played for the user to hear. The user interface device may control a tactile (or haptic) interface, enabling the user to experience touch sensations that the user senses or perceives as feeling the virtual object.

To realistically render virtual content, a VR system may build a representation of the physical world around a user of the system. This representation, for example, can be constructed by processing images acquired with sensors on a wearable device that forms a part of the VR system or a network of cameras. In some implementations, a user might perform an initial routine by looking around a room or other physical environment in which the user intends to use the VR system until the system acquires sufficient information to construct a representation of the target 3D environment (e.g., target property). As the system operates and the user (virtually and/or physically) moves around the environment or to other environments, or selects a different visualization mode, the user interface device might acquire additional information (e.g., from a database or from sensors of the wearable devices) to expand or update the representation of the physical world.

In some implementations, the system may recognize objects in the physical world using a two-dimensional (2-D) object recognition system. For example, the system may process an image acquired by a sensor of the wearable device, used as an input to a 2-D bounding box generation system. The VR system can generate a 3D representation of the physical world using the 2-D bounding boxes for the objects that have been recognized. As the user moves around the environment or to other environments, the VR system can expand or update the 3D representation of the target environment using the 2-D bounding boxes for the objects that have been recognized in additional images acquired by the sensors. The VR system can dynamically adjust the display of the 3D representation of the physical world, in response to one or more triggers.

FIG. 1 depicts a VR system 100 configured to display a 3D representation of a target environment, according to some implementations. The VR system 100 can include one or more sensors 102, a server system 104, a user device 106, and a mobile user device 108, communicating with each other over a network 110.

In some implementations, the network 110 facilitates wireless or wireline communications between the components of the VR system 100 as well as with any other local or remote computer, such as additional clients, servers, or other devices communicably coupled to network 110, including those not illustrated in FIG. 1. In the illustrated VR system 100, the network 110 is depicted as a single network, but may be comprised of more than one network without departing from the scope of this disclosure, so long as at least a portion of the network 110 may facilitate communications between senders and recipients. In some implementations, one or more of the illustrated components may be included within network 110 as one or more cloud-based services or operations. The network 110 may be all or a portion of an enterprise or secured network, while in another instance, at least a portion of the network 110 may represent a connection to the Internet. In some instances, a portion of the network 110 may be a virtual private network (VPN). Further, all or a portion of the network 110 can comprise either a wireline or wireless link. Example wireless links may include 802.11ac/ad/af/a/b/g/n, 802.20, WiMax, LTE, and/or any other appropriate wireless link. In other words, the network 110 encompasses any internal or external network, networks, sub-network, or combination thereof operable to facilitate communications between various computing components inside and outside the illustrated VR system 100. The network 110 may communicate, for example, Internet Protocol (IP) packets, Frame Relay frames, Asynchronous Transfer Mode (ATM) cells, voice, video, data, and other suitable information between network addresses. The network 110 may also include one or more local area networks (LANs), radio access networks (RANs), metropolitan area networks (MANs), wide area networks (WANs), all or a portion of the Internet, and/or any other communication system or systems at one or more locations.

The sensors 102 can include depth sensors and/or image sensors. The depth sensors can be configured to output depth data that can be used to generate physical world matrix 112. The image sensors can be configured to acquire monocular or stereoscopic information that can be processed to generate the physical world matrix 112. The sensors 102 can transmit the physical world matrix 112 to the server system 104.

In some implementations, the server system 104 can be accessible over the network 110. In the example of FIG. 1, the server system 104 is intended to represent various forms of servers including, but not limited to a web server, an application server, a proxy server, a network server, and/or a server pool. Even though the server system 104 is illustrated as being separated from the sensors 102 and the user device 106, in some implementations, the server system 104 can be integrated in the sensors 102 or the user device 106. In some implementations, the server system 104 includes at least one server, at least one database 114 and at least one processor 123. Although illustrated as a single processor 123 in FIG. 1, two or more processors may be used according to particular needs, desires, or particular implementations of the server system 104. The processor 123 may be a central processing unit (CPU), an application-specific integrated circuit (ASIC), a field-programmable gate array (FPGA), or another suitable component. Generally, the processor 123 executes instructions and manipulates data to perform the operations of the mapping engine 116. Specifically, the processor 123 executes the algorithms and operations described in the illustrated figures, including the operations performing the functionality associated with the VR application 130 and VR controller application 140, as well as the various software modules, including the functionality for sending communications to and receiving transmissions from the sensors 102 170, the user device 106 and the mobile device 108.

In general, the server system 104 accepts requests for application services (e.g., mapping engine 116) from the user device 106 and provides services to any number of user devices (e.g., the user device 106) over the network 110. An example database system 114 can include an in-memory database. In some examples, an in-memory database is a database management system that uses main memory for data storage. In some examples, main memory includes random access memory (RAM) that communicates with one or more processors (e.g., central processing units (CPUs)), over a memory bus. An-memory database can be connected with database management systems that employ a disk storage mechanism. In some examples, in-memory databases are faster than disk storage databases, because internal optimization algorithms can be simpler and execute fewer CPU instructions (e.g., require reduced CPU consumption). In some examples, accessing data in an in-memory database eliminates seek time when querying the data, which provides faster and more predictable performance than disk-storage databases.

The server system 104 includes the mapping engine 116 that can process the physical world matrix 112 received from the sensors 102 and user data from the user device 106. The mapping engine 116 can store the results in the database 114, as spatial representation data 118 and auxiliary data 120. In some examples, the mapping engine 116 can convert the depth data, included in the physical world matrix 112, into depth maps 122. Each depth map 122 can include multiple pixels, each of which may represent a distance to a surface in a particular direction relative to a reference point (e.g., location of a depth sensor). Depth maps 122 can be automatically processed upon receipt of a trigger from the user device 106 (e.g., user data) to minimize transition time between subsequent images, to display, by a display 132 of the user device 106, a seemingly smooth and realistic transition between images mimicking a real world experience.

The mapping engine 116 can extract the images included in the physical world matrix 112 and process the images to create a mesh (e.g., 3D tiles), representing all or portions of objects in the physical world and complete any missing portions of the depth maps 122. The mapping engine 116 can stereographically reconstruct images to generate the 3D mesh (e.g., 3D tiles), and may store the 3D mesh (e.g., tagged with location information, elevation information, time stamps, etc.) as spatial representation data 118. For example, the mapping engine 116 can use the mesh for environment reconstruction 126 to generate accurate and clear 3-D images even for scenes where the sensors 128 acquired poor depth information (e.g., scenes with black objects or reflective objects for which depth information tends to be missing, poor, or unreliable) or for regions with occluded features. The mapping engine 116 can process the objects in the physical world and can retrieve (from one or more databases, such as a designer center database, a builder database, or a manufacturer database) data associated with the objects included in the physical world to generate metadata associated with the objects. The metadata associated with the objects of a target 3D environment, includes for example, labels (e.g., identifiers of fixed features and removable features, such as furniture or décor), color, surface texture, upgrade status (existent upgrade, potential upgrade or standard feature), and lifespan data (lifespan to lifetime ratio expressed as percentage or decimal). The metadata associated with the objects can be stored as auxiliary data 120. The auxiliary data 120 can also include user account information (e.g., user name, user identifier, user password, stored credit, user history, and/or user preferences including preferred property styles) and additional data corresponding to a plurality of environmental styles (e.g., furniture and environmental decoration styles). The mapping engine 116 can update depth maps 122 using head and (physical or virtual) body positions relative to the virtual environment to generate an environment reconstruction 126. The mapping engine 116 can transmit the environment reconstruction 126 to the user device 106 to display a particular view of the target environment by the display 132. The mapping engine 116 can receive a user input including a selection of a different environmental style and use the auxiliary data 120 to regenerate the environment reconstruction 126 and transmit the environment reconstruction 126 to the user device 106.

The user device 106 can include sensors 128, a VR application 130, a display 132, and controllers 138. The sensors 128 can include (head, hand, arm, leg, and/or fingers) movement sensors depth sensors, image sensors, and audio sensors (microphone). The data collected by the sensors 128 can be processed by the VR application 130 of the user device 106 and/or mapping engine 116 of the server system 104 to determine user head position and user body position 124. The controllers 138 can be configured to be integrated in the user device 106 or communicatively coupled (e.g., wireless couples) to the user device 106. The controllers 138 can be configured to be removably attached to a body portion of the user (e.g., hands, arms or legs) to enable a user to provide a user input. The controllers 138 can include hand held controllers, gloves, and/or eye gaze controllers. The user input can be processed by the VR application 130 of the user device 106 to authenticate the user and to modify the display 132 based on user preferences.

The display 132 can be worn by the user as part of a headset such that a user may wear the display over their eyes like a pair of goggles or glasses. In some implementations, a portion of the display can be transparent such that a user may observe a see-through reality. The see-through reality may correspond to portions of the physical world matrix 112 that are within a present viewpoint (e.g. field of view) of the VR system 100, which may correspond to the viewpoint of the user in the case that the user is wearing a headset incorporating both the display and sensors of the VR system to acquire information about the physical world. VR contents may also be presented on the display 132, overlaid on the see-through reality, for example to highlight one or more objects of the environment (e.g., upgrades of a property) with or without an associated audio signal provided through speakers 133. To provide accurate interactions between VR contents and the see-through reality on the display 132, the VR system 100 may substantially continuously process sensor data acquired by sensors 128 at a high frequency rate (e.g., higher than 100 Hz) configured to generate the environment reconstruction 136 of the physical world around the user accessing the user device 106.

The sensors 128 may also acquire information about the head pose and/or body pose 134 of the user with respect to the physical world. In some implementations, a head pose tracking component of the system can be used to compute head poses in real time. The head pose tracking component may represent a head pose of a user in a coordinate frame with six degrees of freedom including, for example, translation in three perpendicular axes (e.g., forward/backward, up/down, left/right) and rotation about the three perpendicular axes (e.g., pitch, yaw, and roll). In some implementations, sensors 128 can include inertial measurement units that can be used to determine current head poses and body positions 134 and estimate subsequent (future) head poses and body positions 134. A head pose 134 for a camera image may indicate a present viewpoint of a sensor 128 capturing the camera image with six degrees of freedom, for example, but the head pose 134 can be used for other purposes, such as to relate image information to a particular portion of the physical world or to relate the position of the display worn on the user's head to the physical world corresponding to the environment reconstruction 136.

In some implementations, the user device 106 may construct a spatial representation from the feature points recognized in successive images in a series of image frames captured as a user moves throughout the physical world with the user device 106. Each image frame can correspond to a different pose as the user moves, the VR application 130 can adjust the a particular representation of the features of each successive image frame to match the representation of a reference (e.g., initial) image frame by matching features of the successive image frames to previously captured image frames. Translations of the successive image frames so that points representing the same features will match corresponding feature points from previously collected image frames, can be used to align each successive image frame to match the orientation of previously processed image frames. The frames in the resulting environment reconstruction 136 may have a common orientation established when the reference image frame was added to the spatial representation of the user's pose. This spatial representation, with sets of feature points in a common frame of reference, can be used to determine the user's pose within the physical world by matching features from current image frames to the spatial representation. In some implementations, this spatial representation can be called a tracking spatial representation. In addition to enabling tracking of the user's pose 134 in parallel with the environment reconstruction 136, this spatial representation may enable other components of the VR system 100, such as environment reconstruction 136 according to user preferences specified in a user input, to update the representation of physical objects according to the user preferences. The environment reconstruction 136 may integrate information from the depth maps 122, auxiliary data 120, and head poses 134, and any other data from the sensors 128. The environment reconstruction 136 can include spatial and temporal averaging of the sensor data from multiple viewpoints over time relative to stored environmental models stored as spatial representation data 118.

The environment reconstruction 136 can include representations of the physical world in one or more data formats including, for example, voxels, meshes, planes, etc. The different formats may represent alternative representations of the same portions of the physical world or may represent different portions of the physical world. In some implementations, the spatial representation 118 associated with head pose component 134 can be sparse relative to the spatial representations of the environment reconstruction 136 to minimize data storage without affecting the resolution of the final 3D environment representation generated for display 132. Rather than providing information about locations, and possibly other characteristics, of surfaces, the sparse spatial representation 118 may indicate locations of interest points and/or structures, such as corners, walls, or edges. In some implementations, raw (unprocessed original) data can include image frames as captured by the sensors 128. These frames can be reduced to features, which may represent the interest points and/or structures. In conjunction with each frame, information about the head and body pose 134 of a user from which the frame was acquired may also be stored as part of the spatial representation 118. In some implementations, user input may or may not be transmitted to the server system 104. The VR application 130 may use user input to generate and update the VR contents presented for display 132 or transmit the user input to the server system to retrieve relevant auxiliary data 120 needed to update the display 132. The VR contents modified based on user preferences can be presented on the display 132 in combination with base features of the environment reconstruction 136, creating a realistic user experience.

In some implementations, the user device 106 can be connected to a mobile device 108. In some implementations, the user device 108 can include any appropriate type of computing devices such as a desktop computer, a laptop computer, a handheld computer, a tablet computer, a personal digital assistant (PDA), a cellular telephone, a wearable device (e.g., smart watch or smart glasses), a network appliance, a camera, a smart phone, an enhanced general packet radio service (EGPRS) mobile phone, a media player, a navigation device, an email device, a game console, or an appropriate combination of any two or more of these devices or other data processing devices. The user device 108 can be used for various purposes that include a VR controller animation 140. The mobile device 108 can receive, using a communication interface 142, the 3D information about the user's environment and the information about the new content item. A 3D environment renderer 144 of the VR controller application 140 can render a 3D representation of the user's environment within the VR controller application 140. The 3D representation can include representations of physical objects within the environment and, if applicable, representations of existing virtual content (e.g., upgrades) that are being virtually displayed by the user device 106 in the user's environment.

The VR controller application 140 can include a content selector 146 configured to receive user input from the user indicating a selection of the new content item. The content selector 146 can enable the user to accept or reject the new content item. The acceptance or rejection of a new content item (e.g., upgrade) can be transmitted to the user device 106 as a message followed by an update in display to match the selection entered on the mobile device 108. For example, the VR controller application 140 can send, using the communication interface 142, acceptance or rejection of the new content item to the user device 106. The environment reconstruction 136 can present or project the virtual content item so that the virtual content item matches the selection received from the mobile device 108.

In some implementations, the new content is automatically pushed to the user device 106 and the mobile device 108 as it becomes available. In some implementations, the VR application 130 and the VR controller application 140 can be configured to request approval to display new content. In response to receiving, by the user device 106 and/or the mobile device 108, a user input requesting the new content, the user device 106 and the mobile device 108 can retrieve, from the server system 104, a new content item (auxiliary data 120) that is available for virtual display by the user device 106 and the mobile device 108. For example, the VR application 130, of the user device 106 can determine that auxiliary data 120 including upgrades 121 or lifespan information is available and request the server system 104 to transmit the new content (e.g., upgrades 121) from the database 114 to the user device 106. In response to determining that a new content item is available for virtual display, a notification (e.g., upgrade icon) can be displayed to the user. The notification indicates that a new upgrade is available for a selected 3D environment.

The notification can be virtually displayed to the user by the user device 106. The notification can be shown on a particular physical surface within a room of the 3D environment, or can be displayed as if floating "in space." Other examples include the notification being displayed by a graphical user interface of a mobile device 108 that is connected to the user device 106 or another connected user device.

The user can configure various settings for controlling the display of the notification of available upgrades and other new content notices (e.g., lifespan information). For instance, the user can configure a particular location (e.g., physical surface, physical computing device display) on which to virtually display new content notifications. As another example, the user can configure notification frequency (e.g., display immediately, display periodically) and content type(s) for which to display notices. Once upgrades are displayed, the user can interact with the displayed upgrades to indicate acceptance or rejection of potential upgrades, which can trigger an update of a total upgrade value that can be displayed for the user. The user interface displayed on a mobile device 108 of the user can enable parallel visualization and selection of upgrades of the 3D environment.

Figure 2A:
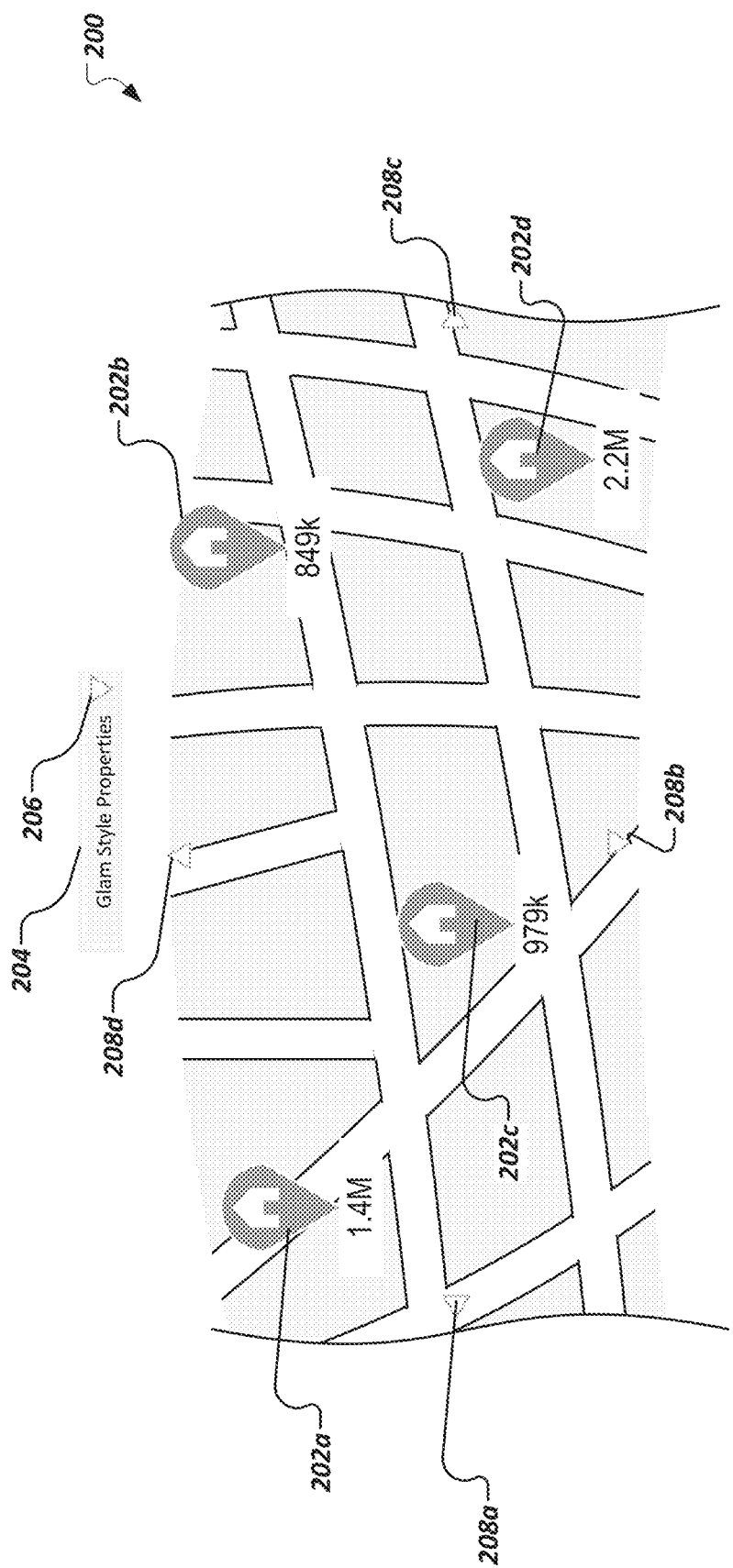
FIG. 2A illustrates an example of a map enabling selection of a 3-D environment to be visualized to execute implementations of the present disclosure.

FIG. 2A is an example of a map 200 that could be displayed for a user to illustrate available properties 202a, 202b, 202c, 202d. In some implementations, the map 200 can be displayed as being curved with a horizontal arc of 120 degrees and a vertical arc of 100 degrees centered on the focal vision of the user. The properties 202a, 202b, 202c, 202d included in the map 200 correspond to a particular user preference indicated in a label window 204 (e.g., property style) that can remain on a top central portion of the map 200 independent of the map changes (e.g., zoom actions or expansion in either direction through scroll movement). The label window 204 can be shifted and fixed by the user in a different location of the map 200. The map 200 can be updated by the user to include a different region or other properties 202a, 202b, 202c, 202d, by selecting the drop down menu icon 206. The map 200 can be scrolled up, down and to the sides through head movement or by selecting (clicking or touching) direction icons 208a, 208b, 208c, 208d. Each of the properties 202a, 202b, 202c, 202d displayed on the map 200 can be selected by a user to interactively view as a 3D environment, as discussed with reference to FIGS. 2B-2F.

FIGS. 2B-2F illustrate an example of a scene of a room 210 of an example of a 3D environment in which a head-mounted imaging system (e.g., user device 106) is used. In some implementations, the head-mounted imaging system can be a virtual reality device that presents to the user an interface for visiting and interacting with a 3D environment that is remotely located from the user.

Figure 2B:
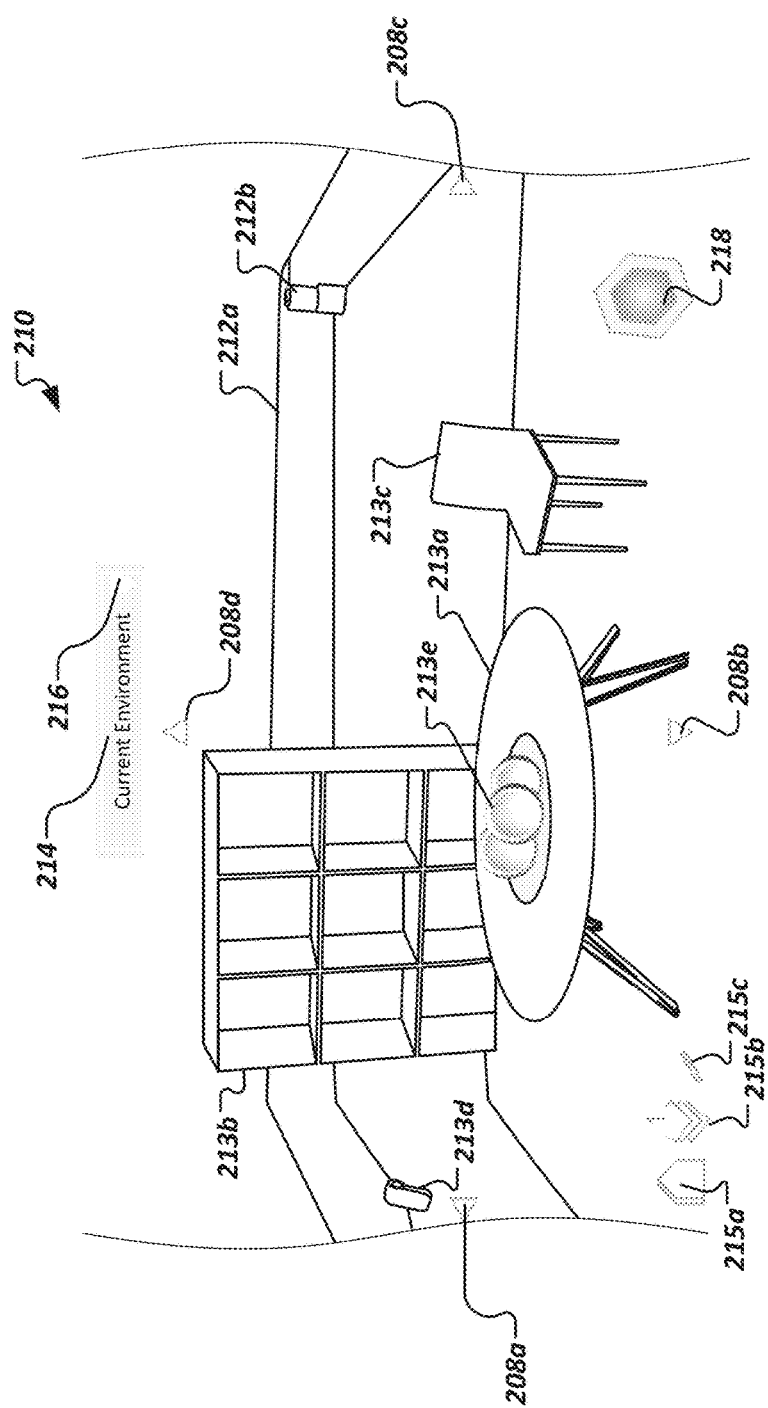
FIGS. 2B-2F illustrate examples of a 3-D environment visualized with a VR system according to implementations of the present disclosure.

The example of the current scene 210 of the room of the 3D environment, as illustrated by FIG. 2B, includes features of a current environment, as captured by the sensors. The features of a current scene 210 of the room of the 3D environment can include fixed features 212a, 212b and removable features 213a, 213b, 213c, 213d, 213e. The fixed features 212a, 212b can include wall features (e.g., wall molding, trims, niches, tiles, bricks, stone, etc.), light fixtures, window treatments (blinds, shutters, etc.), integrated electrical appliances (e.g., HVAC unit, water softener, solar panels, stove, oven, dish washer, etc.) and other features that are permanently attached to the 3D environment or are integrated in the 3D environment. The removable features 213a, 213b, 213c, 213d, 213e can include furniture, decorative items, sensors, and any other features that are not attached to the 3D environment or are removably attached to 3D environment. In some implementations, a guide (e.g., an animated model of a realtor or a recording of a realtor) can be represented as sitting on a chair (e.g., chair 213c) or standing or walking at a set distance (e.g., between 1 and 2 meters) from the visualization point of the user of the user device, while providing audio descriptions of the features of the current environment or pointing to particular features of the current scene 210 of the room of the 3D environment that include upgrades, could be upgraded or have a particular lifespan relative to their average lifetime. The example of the current scene 210 of the room of the 3D environment can include space jump icons 218 that enable a user to jump to different position to quickly move through the current scene 210 of the room of the 3D environment, as an alternate option to virtually walking through the scene 210 of the room of the 3D environment by walking in the real physical environment or by accessing movement controllers of the user device 106. The spatial representation of the guide can be dynamically adjusted relative to changes in the position of the user to maintain the set distance between the guide and the visualization point of the user of the user device. The example of the current scene 210 of the room of the 3D environment can include icons 215a, 215b that enable quick access to view the other rooms of the 3D environment by visualizing the property as a doll house or enable access to the entry point of a different floor level. The example of the current scene 210 of the room of the 3D environment can include a measurement icon 215c that enables quick measurement of the current scene 210 of the room of the 3D environment.

The visualization mode (e.g., current environment) can be indicated by a label 214 that can be displayed as overlaying a portion of the room in a center top of the current scene of the room 210. The label 214 can be semitransparent. The label 214 can be shifted and fixed by the user in a different location of the example of the scene of the room 210. The example of the current scene 210 of the room can be updated by the user to illustrate a different property or a different display mode of the property by selecting the drop down menu icon 206. For example, the user can select to see an empty room version 220 of the room of the 3D environment, as illustrated in FIG. 2C.

Figure 2C:
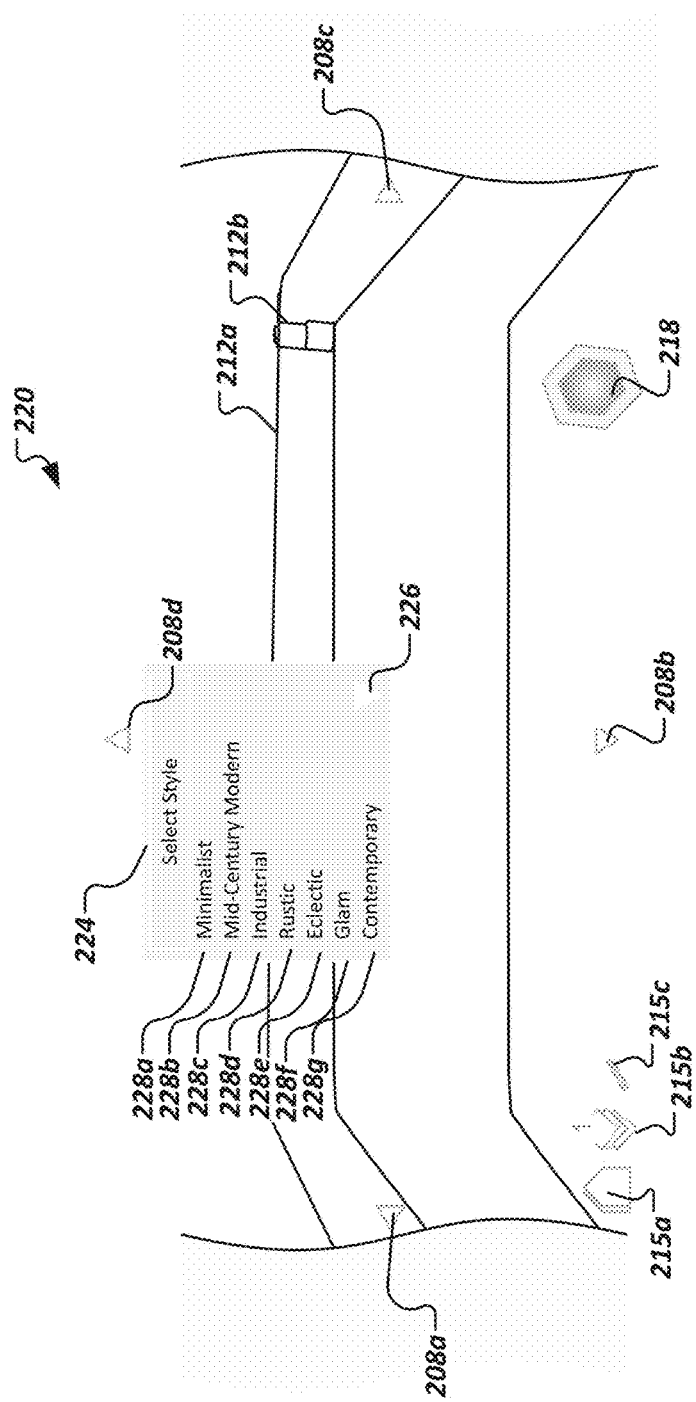

The empty room version 220 of the room of the 3D environment, shown by FIG. 2C, can be generated by the mapping engine 116 by processing the depth maps and images captured by the sensors 102 to remove all removable features 213a, 213b, 213c, 213d, 213e of the room and maintain the basic structure of the 3D environment (e.g., ceilings, walls, floor, doors, etc.) with the fixed features 212a, 212b. In some implementations, a guide (e.g., an animated model of a realtor or a recording of a realtor) can be represented as standing or walking at a set distance from the visualization point of the user of the user device, while providing audio descriptions of the features of the current environment or guiding the user to adjust a display of the current scene 220 of the room of the 3D environment. In some implementations, in response to selecting the label 214, a drop down menu 224 can be displayed. The drop down menu 224 can include a list of possible viewing styles 228a, 228b, 228c, 228d, 228e, 228f, 228g that are compatible with the selected 3D environment. The drop down menu 224 can include an icon 226 that enables the user to scroll up or down to access additional viewing styles. In response to a selection of a possible viewing style, the display view can be updated to illustrate the selected style version 230 of the room of the 3D environment, as shown in FIG. 2D.

Figure 2D:
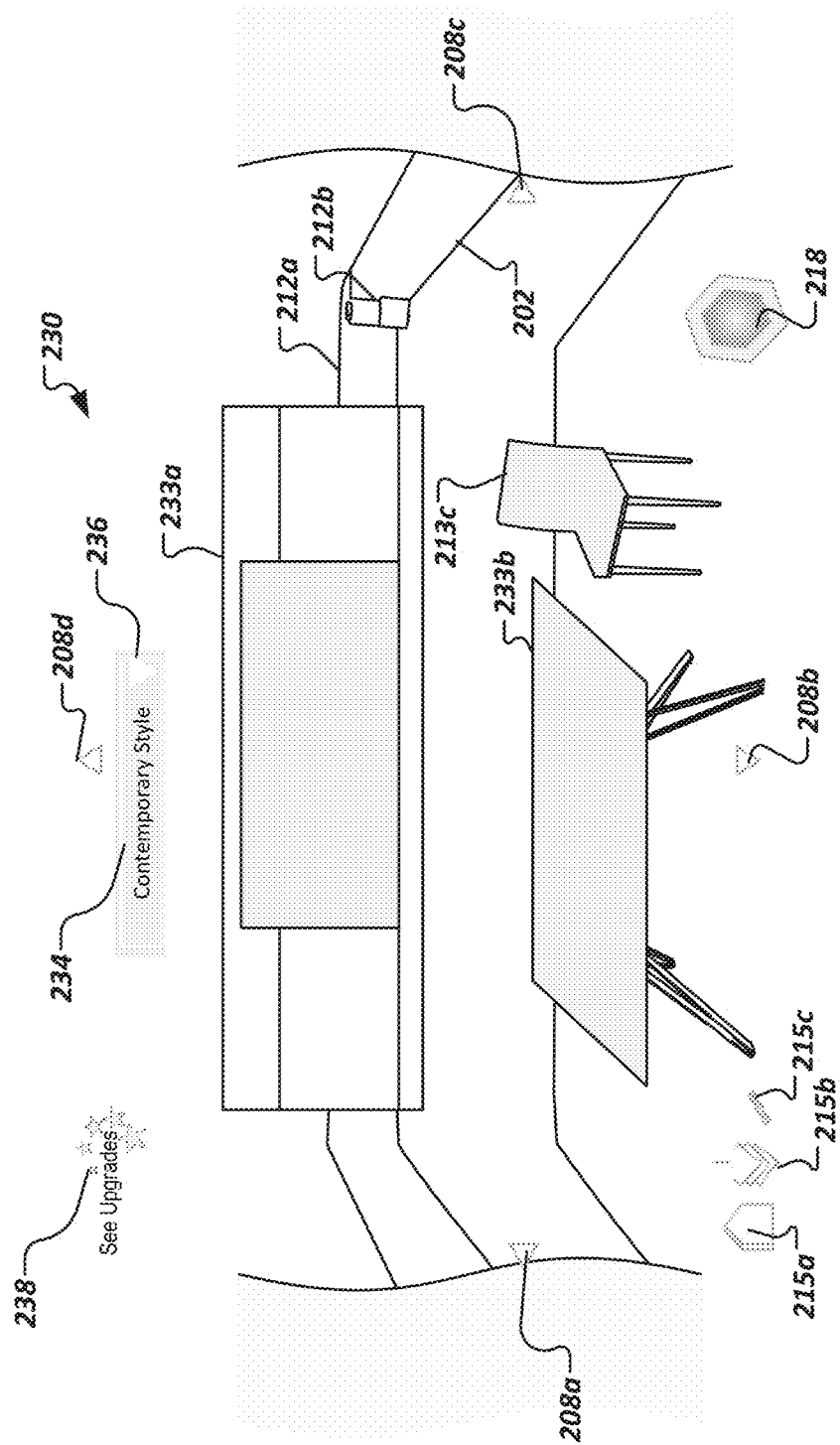

The selected style version 230 of the room of the 3D environment, shown by FIG. 2D, can be generated by the mapping engine 116 by processing the empty room version 220 of the room of the 3D environment to add removable features 233a, 233b, 213c to the basic structure of the 3D environment (e.g., ceilings, walls, floor, doors, etc.) with the fixed features 212a, 212b. The removable features 233a, 233b, 213c that are added can include furniture items and other items that are extracted from a database that includes items compatible with the selected 3D environment and are classified as corresponding to the selected style (e.g., contemporary). In some implementations, the selected style version 230 of the room of the 3D environment is indicated a label 234 that includes an icon enabling access to a drop down menu 236. In some implementations, the display of the selected style version 230 of the room of the 3D environment includes an upgrade icon 238 that enables a user to view upgrades.

Figure 2E:
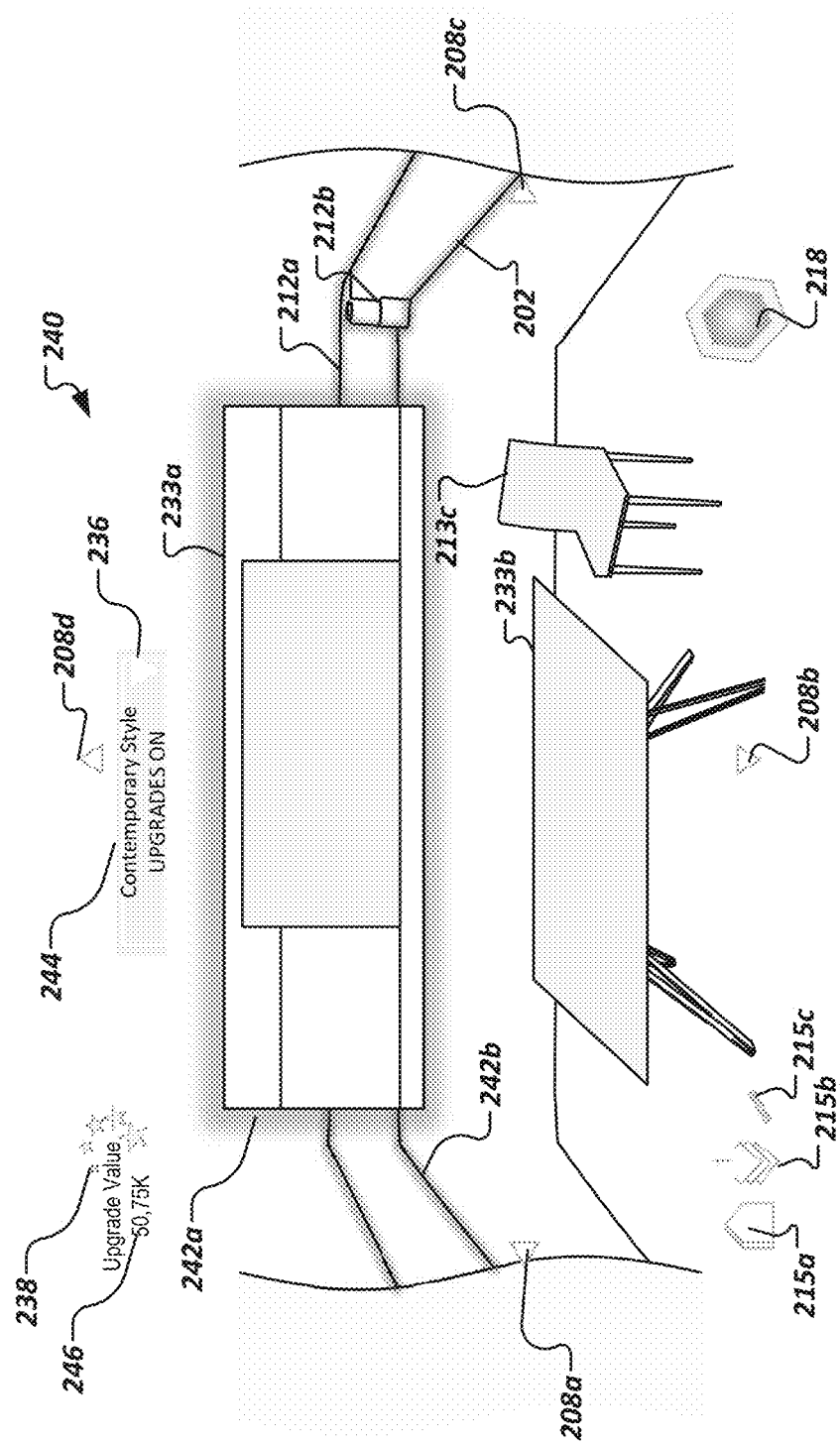

In response to a selection to view upgrades (e.g., click of the upgrade icon 238), the display view can be updated to illustrate a highlighted version 240 of the room of the 3D environment, as shown in FIG. 2E. The label 244 of the highlighted version 240 of the room of the 3D environment can indicate that upgrades are being displayed. The highlights 242a, 242b can be added by the mapping engine 116 as (white or color-coded) light strips around the upgrades. The highlights 242a, 242b can be displayed around fixed features and/or removable features of the room of the 3D environment. In some implementations, different highlight styles (e.g., colors, width, intensity, luminosity, etc.) can be applied to differentiate between existent upgrades and/or or available upgrades. The characteristics (e.g., thickness, transparency, and luminosity) of the highlights can be dynamically changed based on a distance between a virtual position of the user and a location of the highlighted feature to optimize visualization of all existent features such that a highlight would not completely obstruct beyond recognition any feature of the virtual environment. For example, while features (e.g., appliance, object) of the environment become larger as the distance between a virtual position of the user and a location of the highlighted feature decreases, the thickness of the highlighting strip and its luminosity can decrease to enable the user to optimally (clearly) visualize the upgraded feature. In some implementation, a user can select a highlighted removable feature to discard an optional available upgrade. In some implementation, a value label 246 is displayed near the upgrade icon 238, the value label presenting a total value of all selected (non-discarded) available upgrades.

In some implementations, the highlighted version 240 of the room of the 3D environment, as shown in FIG. 2E can be generated by a head-mounted imaging system configured as a mixed reality device. The highlighted version 240 of the room of the 3D environment can be presented, by the mixed reality device, as a user an interface for interacting with and experiencing a mixed reality world to assist the user to recognize and better appreciate particular features of the 3D environment. The mixed reality world can include computer-generated content and real world physical objects in the user's physical environment. Within the context example of the mixed reality world, the head-mounted imaging system can provide images of virtual objects or features of objects (e.g., updated color layers and added highlights indicating upgrades of 3D environment) intermixed with physical objects in a field of view of the user, for example. The mixed reality world can be seen by the user through eyepiece(s) of the head-mounted imaging system. The eyepieces of the head-mounted system can be at least partially transparent and serve as "optical see-through" displays through which the user can view real objects in the user's physical environment. The user's physical environment is the physical surroundings of the user as the user moves about and views real world objects through the head-mounted system.

Figure 2F:
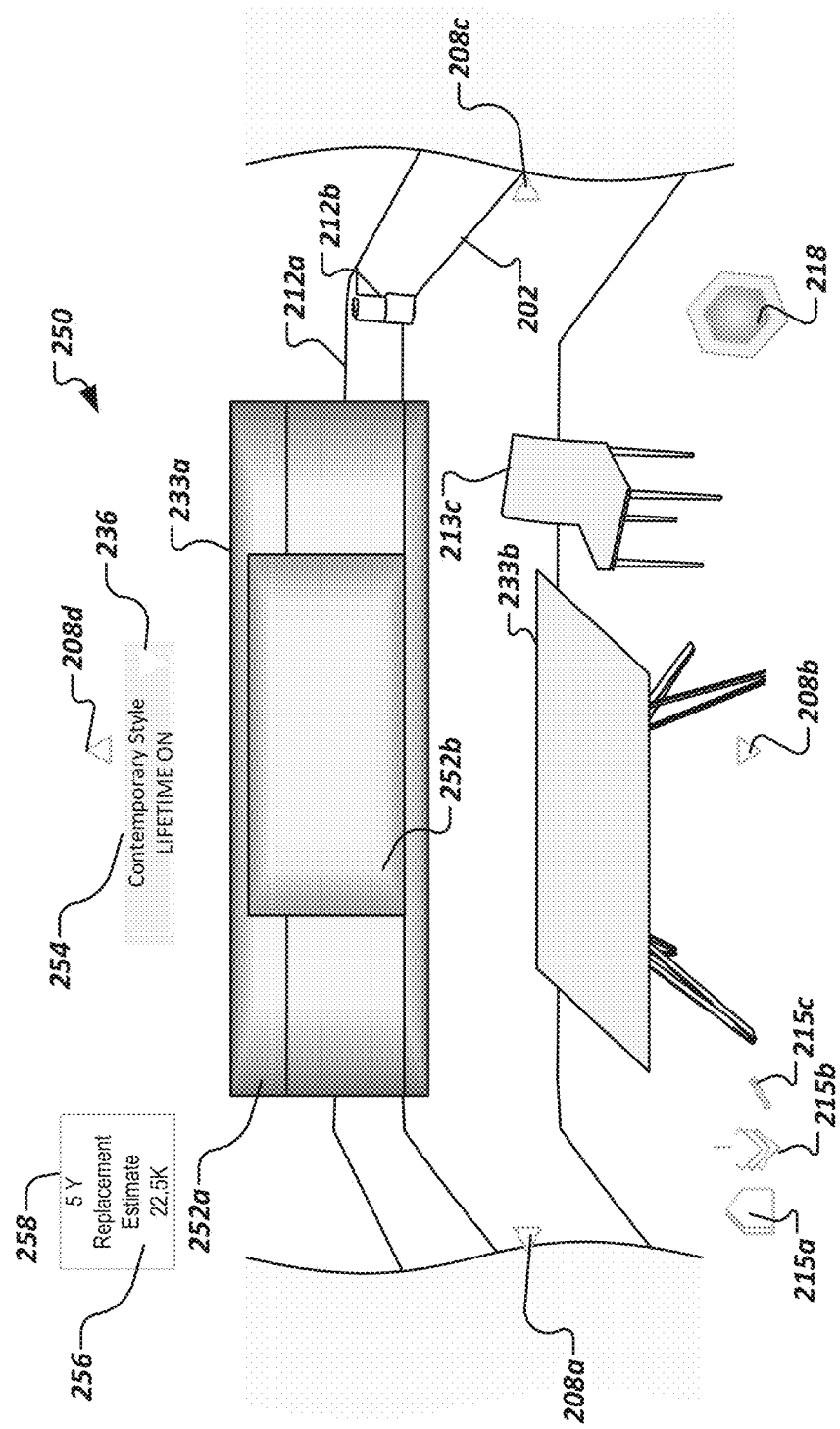

In response to a selection to view lifetime of features (e.g., click of the lifetime icon 258), the display view can be updated to illustrate a lifetime version 250 of the room of the 3D environment, as shown in FIG. 2F. The label 254 of the lifetime version 250 of the room of the 3D environment can indicate that the age of each feature is being displayed as a color-coded layer. The color-coded layers 252a, 252b can be added by the mapping engine 116 as (white to black or green to red masks) within the margins (geometrical borders) of the corresponding features. The color-coded layers 252a, 252b can be displayed within fixed features and/or removable features of the room of the 3D environment in parallel with a replacement estimate 256 for a future period of time.

The color-coded layers 252a, 252b can be used to illustrate age of features of the environment relative to their lifetime, wherein a first color code (e.g., green) can use used to indicate a (relatively or substantially) new feature and a second color core (e.g., red) can use used to indicate a (relatively or substantially) old or damaged feature estimated to be close to replacement (e.g., end of lifetime). In some implementations, the color-coded layers 252a, 252b used to illustrate age of features of the environment can overlap an entire surface of the features or only a portion of the features (e.g., with minimum transparency around the margins and maximum transparency towards the center of the corresponding feature) as to enable parallel visualization of all features within the environment without interference between the display of color-coded layers (object mask) of different features.

Figure 2G:
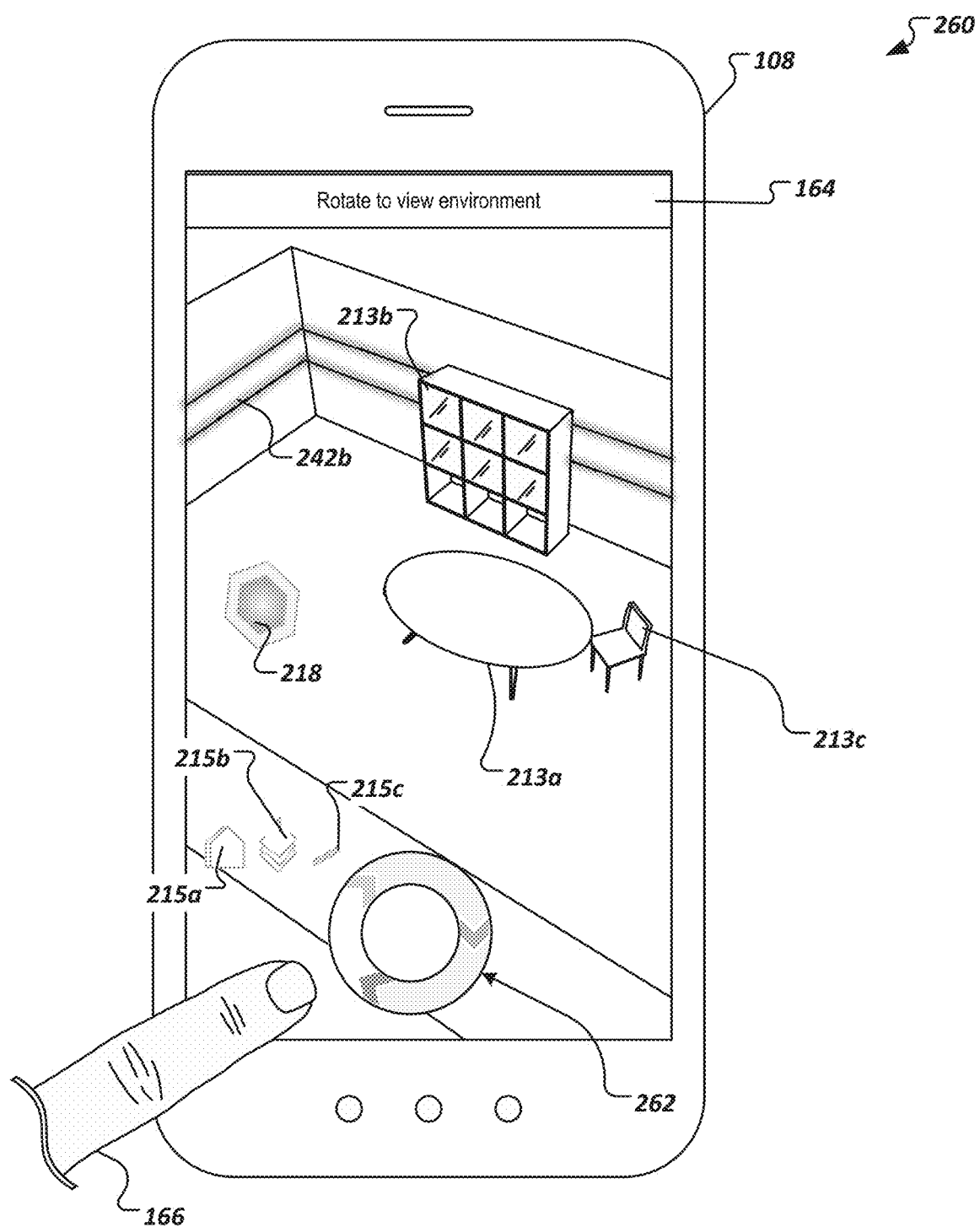
FIG. 2G illustrates an example of a mobile device user interface according to implementations of the present disclosure.

FIG. 2G illustrates a highlighted version 260 of the room of the 3D environment that can be displayed in parallel on a mobile user device 108. In some implementations, the user interface of the mobile user device 108 can enable movement independent from the virtual movement projected by the headset device. For example, the user interface of the mobile user device 108 can update the view the 3D environment enable in response to detecting a rotation of the user device 108. The user interface of the mobile user device 108 can include an icon 262 that enables modification of the viewing angle of the 3D environment. In some implementations, a user of the mobile user device 108 can click on a highlighted feature to discard the optional available upgrade that is illustrated as a highlighted removable feature. The mobile user device 108 can transmit to the connected user device (e.g., user device 106 of FIG. 1) a message including an indication of the discarded feature on the mobile user device 108. In response to receiving the upgrade removal message, the connected user device can update its display (e.g., display 132 described with reference to FIG. 1) such that the discarded feature also becomes discarded (highlighting characteristic removed) in the highlighted version 240 of the room of the 3D environment that is visualized in parallel.

The connected user device can be configured such that when the user turns the head or looks up or down, display devices within the user device 108 continue to render virtual content (e.g., added highlights indicating upgrades of the 3D environment) so that it appears to remain affixed around an associated object within the 3D environment. Virtual content can include or correspond to highlights, color overlay (that modifies original color of the captured objects), labels, icons, digital pictures (e.g., pictures illustrating an environment exterior to the 3D environment that could be seen through the windows of the 3D environment at a particular time of a day), videos, or music, to name a few examples. Virtual digital content may correspond to content stored on a storage device that is accessible by the connected user device or virtual content can be a presentation of streaming content, such as a live video feed (e.g., an animated video of a swimming pool visible through a window of the 3D environment). Multiple items of virtual content can be virtually displayed on multiple, different physical surfaces in a room of the 3D environment, to increase an overall workspace area for the user onto which virtual content can be displayed. Various planar surfaces can be designated as virtual displays, for example.

Figure 3A:
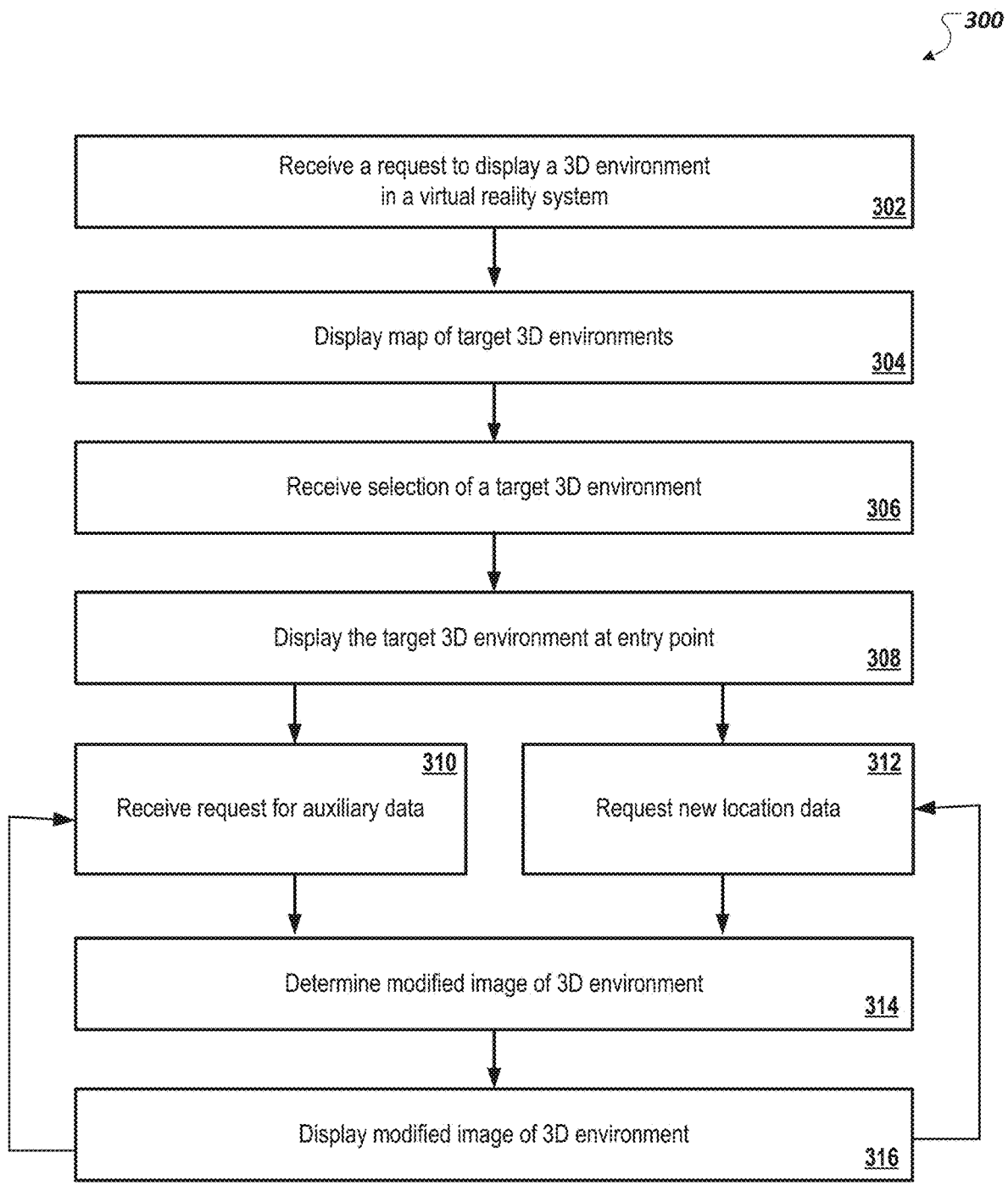
FIGS. 3A and 3B are flow charts of example processes that can be used to execute implementations of the present disclosure.

FIG. 3A is a flow chart of an example process 300 for displaying a 3-D environment from a stream of input images of a scene filtered and updated based on user preferences. The process is described as being performed by a VR system (e.g., VR system 100, described with reference to FIG. 1). A portion of the process 300 can be performed in a cloud-computing environment (e.g., server system 104 described with reference to FIG. 1). In some implementations, a portion of the process 300 can be executed by one or more user devices (e.g., user device 106 and mobile device 108 described with reference to FIG. 1) that are connected to the cloud.

A request to display a 3D environment in a VR system (e.g., user device 106) is received (302). The request can include one or more parameters defining a set of target 3D environments (e.g., a location of target 3D environments within a given radius from a selected geographical point, a price range, house type, house style, amenities, size, number of bedrooms, number of bathrooms, etc.). The request can be provided as an audio input, a list selection input (entered through interaction with a graphical user interface), or can be automatically generated based on historical user searches. The request can be processed to generate a map of target 3D environments.

The map of target 3D environments is displayed in 3D by a user device configured to display 3D environments and/or in 2D by a mobile device (304). In some implementations, the map can be displayed, by the user device, as being curved with a horizontal arc of 120 degrees and a vertical arc of 100 degrees centered on the focal vision of the user. The target 3D environments included in the map correspond to the parameters included in the request. The map can include a label window indicating one or more of the parameters (e.g., property style). The label window can be displayed as floating in a particular portion of the map (e.g., on a top central portion of the map) independent of the map changes (e.g., zoom actions or expansion in either direction through scroll movement). The label window can be shifted and fixed by the user in a different location of the map. The label window can include a drop down menu. The map can be updated by the user to include a different region or other properties, by modifying a parameter selectable in the drop down menu of the label window. The map can be scrolled up, down and to the sides through head movement or by selecting (virtually clicking using a controller of the VR system or touching a user interface of the mobile device) direction icons. Each of the properties displayed on the map can be selected by a user to interactively view as a 3D environment.

A user input including a selection of a target 3D environment is received by a user device (306). In response to receiving the user input indicating the selection of the target 3D environment, a request for a model of the target 3D environment is generated and transmitted to a server system. In some implementations, the model of the target 3D environment can be stored in a database (e.g., database 114 of the server system 104, as described with reference to FIG. 1). In some implementations, the user device receives the model of the target 3D environment as a set of input images, including a scene identified as corresponding to an entry point. The set of input images can include a set of color images and a set of depth images. The set of processed images that were collected by one or more sensors that captured the scene from one or more sensor (camera) poses. In some implementations, an AR device can capture a set of input images while a user (e.g., an agent) of the AR device travels in the scene in real time, while a user of the user device (e.g., VR device or mobile device) can view the scene at a remote location (spatially separated from the target 3D environment). Either pre-stored or collected in real time, the set of input images can include corresponding camera pose information. The camera pose can include six degrees of freedom (6DOF), including freedom to change the camera pose forward and backward, up and down, left and right relative to a coordinate system of the surrounding environment. The user device can project an animation on the display of the user device, while the selected target 3D environment is retrieved from the database of the server system. The user device is configured to process the model of the target 3D environment using a VR (controller) application to generate a display of a portion of the target 3D environment.

A scene at an entry point of the target 3D environment is displayed (308). In some implementations, the entry point of the target 3D environment can include a region near a main entrance of a property or a portion of a property classified as including a feature of interest with a highest ranking (e.g., a most beautiful or unique feature of the property defined based on a ranking associated to a plurality of features of the property). In some implementations, the VR application is configured to provide an animated transition (e.g., a video simulation of a movement) leading towards the entry point of the target 3D environment that is being displayed as a scene.

The scene of the target 3D environment can either include a small region or a large area, e.g., a room, a floor of a building, or as large as a city, etc. The objects in the scene can include 3-D real world objects. The target 3D environment can include visual objects and audio signals. The visual objects can be stationary objects or moving objects. In some implementations, the scene can include a virtual projection of a person (e.g., an agent) who can virtually guide the user through the visualization of the target 3D environment. The virtual projection of the person can be added to the 3D model as a 3-D object mask of the person represented as sitting, standing, or walking. The audio signal that is provided, can be a pre-recorded signal describing each scene of the target environment or a real-time audio signal transmission of a person who visualized the target 3D environment in parallel with the user to enable a real conversation between the user and the projected person. The object data specifying visual objects that have been recognized can include previously calculated 3-D bounding boxes and/or 3-D object masks of the objects in the scene. The system can maintain object data by storing selected object data in a storage system that can be either on a VR device or in the cloud, or both.

A user input including a request for modified content is received by the user device (310). The request for modified content can include a request to represent the scene (and subsequently the entire) target 3D environment in a different format. The format of the target 3D environment can include a current format (illustrating the target 3D environment as captured by the sensors and currently available in the physical world), an empty format (illustrating the bare structure of the target 3D environment with or without its fixed features), and a compatible styled format (e.g., contemporary, eclectic, rustic, minimalist, mid-century, industrial, glam, traditional, futuristic, etc.) or a combination of two or more styles of formats. The request for modified content can include a request to display a recommended view. For example, the features of a scene could be optimally visualized from a particular angle, height, and/or light, such as the view of a room that provides a spectacular scenic view at sunrise, sunset, or at night. The request for modified content can include a request to display auxiliary data. The auxiliary data can include highlights of upgrades, as described with reference to FIG. 2E, color-coded layers that illustrate lifespan, as described with reference to FIG. 2F, or overlapping layers (object mask) that indicate a functionality of a feature (e.g., light fixture being in an on or off state). The request can be provided as an audio command or as an input in the graphical user interface (e.g., selection of an icon displayed by the user device). In some implementations, in response to receiving the request to display auxiliary data, the auxiliary data is retrieved from a database (e.g., database 114 of FIG. 1) and it is formatted to be displayed by the user device as described with reference to FIGS. 2E and 2F. In some implementations, a value of the features associated with the auxiliary data is being calculated to be displayed by the user device as described with reference to FIGS. 2E and 2F.

A request for new location data is detected and processed by the user device (312). The location data can be 3D coordinates, region identifier(s), object identifiers, or some other type of location information. The user device can be configured to detect different types of requests for new location data. For example, the user device can include sensors configured to detect user's movements (changes in head and/or body pose) in the physical world. The user device can be configured to process sensor (position) data to automatically generate a request for new location data to trigger updates of the display of the 3D target environment to mimic the detected movement in the displayed environment. The user device can be configured to receive and process a user input including an audio command requesting display of a new location. The display of the scene of the target 3D environment can include icons that enable quick access to view the other rooms of the target 3D environment by visualizing the property as a doll house or enable access to the entry point of a different floor level. The display of the scene of the target 3D environment can include space jump icons that enable a user to select (using a controller) a jump icon to jump to different locations within the 3D environment, as an alternate option to virtually walking through the target 3D environment by walking in the real physical environment or by accessing movement controllers of the user device.

An updated content of the target 3D environment is determined (314). The updated content of the target 3D environment can include a filtered target 3D environment generated by the server system. The filtering process can include object identification using depth maps and colored images, object classification to differentiate between structural features (e.g., walls, windows, entryways), fixed features (lighting fixtures, major kitchen appliances, window treatments, etc.), and removable features (e.g., pieces of furniture and décor) of the 3D environment. The filtering process can include removal of objects identified as removable features and reconstruction of structural features and fixed features that were previously covered by the removable features. The updated content of the target 3D environment can include a styled target 3D environment generated by the server system. The styling process can include adding (as masks) objects corresponding to one or more selected styles that are compatible with the target 3D environment to the filtered target 3D environment. The updated content of the target 3D environment can include a highlighted mode to emphasize the upgrades included in the target 3D environment and/or a lifetime mode to illustrate by using color coded layers (masks) the lifespan of each of the illustrated features relative to an estimated future replacement cost within a given period of time (e.g., 5 years or 10 years). The updated content of the target 3D environment can correspond to new location data, such that the generated scene can be perceived as being seen from a new location, height, and/or angle. The display characteristics (e.g., thickness, transparency, contrast, and intensity) of the auxiliary data (e.g., highlights and/or color-coded layers) corresponding to the updated content of the target 3D environment is dynamically adjusted based on the distance between the user and each of the displayed feature to improve the visibility of the features. For example, the thickness of the highlight strips surrounding features that are closer to the user can be smaller than the thickness of the highlight strips surrounding features that are further from the user. The transparency of the color-coded layers of features that are closer to the user can be lower than the transparency of the color-coded layers of features that are further from the user. In some implementations, if the distance between the visualization point within the virtual environment and a feature (object) of the 3D virtual environment is below a particular threshold (e.g., smaller than 50 cm or 20 in), the highlight and/or color-coded layers of the respective feature is automatically removed or replaced by a label describing a value of the upgrade or a remaining lifetime and estimated value of replacement at estimated end of life time.

The updated content of the target 3D environment is displayed (316). The updated content of the target 3D environment including auxiliary data can be displayed in a highlighted mode and/or a lifetime mode. The highlights can be displayed around fixed features and/or removable features of the room of the 3D environment. In some implementations, different highlight and color-coded layer styles (e.g., colors, width, intensity, luminosity, transparency etc.) can be applied to differentiate between existent upgrades and/or or available upgrades, and new features relative to features estimated to require a replacement. In some implementation, the user device can be configured to enable a user can select a highlighted removable feature to discard an optional available upgrade. In some implementation, a value label is displayed near the upgrade icon or the lifetime icon. The value label can include a total value of all selected (non-discarded) available upgrades and/or an estimate of future replacement costs relative to a selected time period (e.g., next 5, 10, 15, or 20 years). In some implementations, a request for modified content (310) and/or new location data (312) can be received multiple times, the process 300 being at least partially repeated to determine an updated content (314) and display the updated content (316). In some implementations, when a user completes a visualization visit of the target 3D environment, the user can be provided with an option to store the updated content (selected upgrades) of the target 3D environment for revisiting at a later time, for comparison with other 3D environments or for performing an associated process (e.g., a purchase of the viewed property using the total value of the selected upgrades). In response to receiving a user input including an approval to save the data, the updated content (selected configuration mode and upgrades) of the target 3D environment can be included in a user file that can be stored by the user device or can be transmitted to the server system for saving. In some implementations, when a user completes the visualization visit of the target 3D environment, a user input is requested to determine a user's interest in purchasing the property. In response to receiving a user input indicating an interest in purchasing the property, an offer to purchase the target property (recently visualized property) including the selection of the preferred upgrades can be generated for the user account. Otherwise, in response to receiving a user input indicating a lack of immediate interest in purchasing the property, the display can be updated to include the map of the 3D targets, wherein the visited target 3D environment is highlighted to indicate a completed visualization and the user can select another property and repeat the example process 300 for visualizing and interacting with the newly selected property.

Figure 3B:
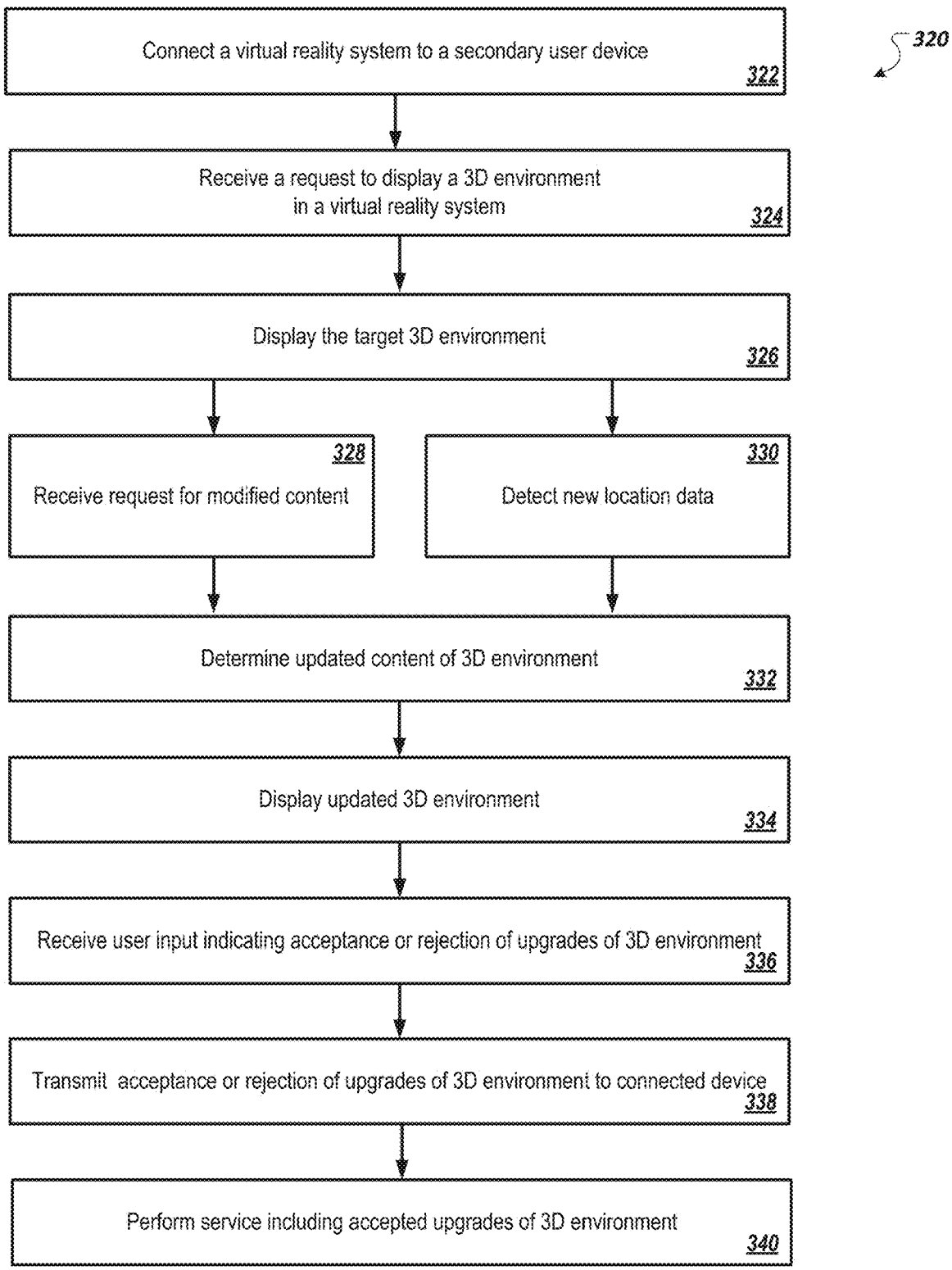

FIG. 3B is a flow chart of an example process 320 for displaying a 3-D environment from a stream of input images of a scene filtered and updated based on user preferences. The process is described as being performed by a VR system (e.g., VR system 100, described with reference to FIG. 1). A portion of the process 300 can be performed in a cloud-computing environment (e.g., server system 104 described with reference to FIG. 1). In some implementations, a portion of the process 300 can be executed by a plurality of user devices (e.g., user device 106 and mobile device 108 described with reference to FIG. 1) that are connected to each other and can also be connected to the cloud.

A request to connect a VR system (e.g., user device 106) to a secondary user device (e.g., another VR system, such as user device 106 or a mobile device 108 as described with reference to FIG. 1) is received (322). The data and interaction management operations can use different types of connection protocols depending on the usage of the application. For example, an online option of connecting to an IoT or m2m (machine-to-machine) platform using Hypertext Transfer Protocol (http) or Transmission Control Protocol (tcp) communications can be used. In another option, connections to different tablets and/or smartphones using tcp can be used. Still further, in an offline solution, the devices can be used in a standalone manner to connect to one or more devices directly, in a simulation without additional devices, or via Bluetooth or other device-to-device communications. Using the solution, simple message management between different kinds of applications interacting with each other is possible, regardless of whether those applications are virtual or real devices or components. The use of random generators or simulated data allows the solution to create virtual sensors easily based on very few simple interactions. The VR system (e.g., user device 106) can be connected to the secondary user device as devices with equal controlling rights such that user inputs entered on each of the device can be used to update displays based on a chronological priority of the user inputs. In some implementations, one of the VR system and the secondary user device can be defined as a master such that a user input entered on the device defined as the master can cancel an update that was previously requested by the other device. In some implementations, the VR system and the secondary user device are located near to each other, remote from a 3D environment. In some implementations, the VR system and the secondary user device are remotely located from each other, one of the VR system and the secondary user device being located within the 3D environment.

A request to display a 3D environment in a VR system (e.g., user device 106) is received (324). Within the context example of one of the VR system and the secondary user device being located within the 3D environment, the request to display the 3D environment can include a request to activate one or more sensors of the device located within the 3D environment to generate a live view of the 3D environment. In some implementations, an RGB-D camera can generate a stream of color images and a stream of depth images of the scene as the user who wears the device travels in the scene. For example, as a user wearing the device enters a living room and the connected device can receive in real time images recorded while the other user enters the living room. The device can receive a plurality of images corresponding to a camera integrated within the 3D environment that captures images of the user walking through the environment. As the user walks towards an object within the scene (e.g., chair or couch), the device can prompt the user to sit and can continue to capture a plurality of images corresponding to a static pose of the user. The images captured from cameras and sensors integrated in the device can be a stream of images of the scene. The stream of images of the scene captured by a plurality of camera poses can provide abundant 3-D information of the 3-D objects in the scene. The stream of images of the scene can be used to generate object recognition outputs even though some of the objects are occluded or not visible at some of the camera poses. For example, the stream of images of the scene can include a stream of color images and a stream of depth images that can be transmitted to be processed in parallel to reconstruct occluded featured of the 3D environment.

Color images are frames of two-dimensional (2-D) images or videos captured by a camera. Each 2-D image can be an RGB image depicting colors of one or more objects and colors of their surrounding environment in the physical world. The color images and depth images can be captured in parallel at different frame rates, or in some implementations, at the same frame rate, using a series of corresponding timestamps. For example, the stream of color images can be at more than 10 frames per second, and the stream of depth images can be higher than 5 frames per second. The stream of color images and the stream of depth images can be in different image resolutions. For example, the stream of color images can have much higher resolution than the stream of depth images. In some implementations, the one or more devices can perform preprocessing on the user (mobile) devices, using the VR application, before sending the processed images to the server system to minimize the size of the transmitted data without decreasing the quality of the information (enabling high resolution reconstruction of captured and processed images).

The server system receives as input each of a plurality of color images in the stream of color images. The server system may process each color image in the stream of color images. Alternatively, the server system may process a subset of color images selected at a certain time interval from the stream of color images. That is, the server system may not process every color image in the stream of color images. The stream of depth images can be temporarily stored in a storage system while the server system processes the color images.

The timestamp information can be used to correlate the color images to the depth images. In some implementations, the one or more devices and sensors can send the stream of images to the server system. A mapping engine (e.g., mapping engine 116 of FIG. 1) can process the stream of images of the scene and can generate data specifying one or more 3-D bounding boxes of the one or more objects in the scene. The generated 3-D bounding boxes of the objects can be overlaid with a template 3D model of the scene based on detected characteristics. For example, each 3-D bounding box of an object includes an estimated rectangular box that tightly surrounds the object. The 3-D bounding box can be defined by the coordinate of a corner or other reference location of the box, a width, a height, and a depth of the box. In some implementations, the 3-D bounding box can be specified using a set of reference coordinates relative to a fixed point on the surface of the bounding box (e.g., a different coordinate than the corner of the box, for example, an anchor point).

In some implementations, the input color images are processed using an object recognition system. The object recognition system can generate a 2-D object recognition output from an input color image. The 2-D object recognition output can include data that identifies a respective object mask in the color image for each of one or more objects that have been recognized in the color image. The object mask can include values of a plurality of pixels that can indicate whether a pixel belongs to an object or not, i.e. a foreground pixel or a background pixel. For example, a contour of a segmentation mask of a chair on which a user is sitting within the 3D environment is overlaid on top of an input color image. The region inside the contour indicates pixels that belong to the depicted sitting user. The 2-D object recognition system can implement one or more computer vision algorithms that perform 2-D object recognition. The one or more computer vision algorithms can include a machine learning based algorithm, e.g., one that uses a machine learning model that has been previously trained with training data that includes 2-D object mask labels that can be classified based on particular property styles. Various 2-D object recognition algorithms can be used, such as Mask Region-Convolutional Neural Network (R-CNN), a Single Shot Detector (SSD), and a YOLO Detector, etc. For example, the 2-D object recognition system can use a Mask R-CNN neural network trained on an object detection dataset, which detects indoor objects of interest, e.g., chair, table, sofa, TV, etc. Mask R-CNN can generate a binary mask for each of a predetermined number of objects. Each binary object mask can separate the foreground object (removable feature) from the background (structural and fixed features). The mapping engine can create, update, and format a 3D model transmissible for display on the user device and the mobile device with configurable features. For example, each object in the 3D model of the target 3D environment can be replaced by an object identifier based on a predefined index, an object position identifier, color identifier, and a size identifier. The data formatting can include a matrix of the object identifiers to minimize the size of the data transmitted between devices and optimize the speed of data transmission to recreate a real-time display of the target 3D environment with high resolution.

A scene of the target 3D environment is displayed by the user device and the secondary user device (326). In some implementations, the scene of the target 3D environment can correspond to a current position of a user physically located within the 3D environment or an entry point of the 3D environment. In some implementations, the user device and the secondary user device point of the target 3D environment can display a scene of the 3D environment seen from an identical or similar viewing point, such that the two displays include a similar set of visible objects. In some implementations, the user device and the secondary user device point of the target 3D environment can display a scene of the 3D environment seen from independently selected viewing points, which can be rejoined at any point in time, in request to a user input on any of the connected devices.

A user input including a request for modified content is received by any of the user device and the secondary user device (328). The request for modified content can include a request to represent the scene (and subsequently the entire) target 3D environment in a different format. The format of the target 3D environment can include a current format (illustrating the target 3D environment as captured by the sensors and currently available in the physical world), an empty format (illustrating the bare structure of the target 3D environment with or without its fixed features), and a compatible styled format (e.g., contemporary, eclectic, rustic, minimalist, mid-century, industrial, glam, traditional, futuristic, etc.) or a combination of two or more styles of formats. The request for modified content can include a request to highlight upgrades (existent upgrades and/or or available upgrades) visible in the scene and/or a request to display lifespan of features relative to their corresponding lifetime and history of usage (e.g., derived from feature sensor data, statistical estimates based on lifestyle of recorded users, and recorded purchases). The request can be provided as an audio command or as an input in the graphical user interface (e.g., selection of an icon displayed by the user device).

A request for new location data is detected and processed by any of the user device and the secondary user device (330). The location data can be 3D coordinates, region identifier(s), object identifiers, or some other type of location information. The user device and the secondary user device can be configured to detect different types of requests for new location data. For example, the user device and the secondary user device can include sensors configured to detect user's movements (changes in head and/or body pose) in the physical world. The user device and the secondary user device can be configured to automatically generate a request for new location data to trigger updates of the display of the 3D target environment to mimic the detected movement in the displayed environment. The user device and the secondary user device can be configured to receive and process a user input including an audio command requesting display of a new location. The display of the scene of the target 3D environment can include icons that enable quick access to view the other rooms of the target 3D environment by visualizing the property as a doll house or enable access to the entry point of a different floor level. The display of the scene of the target 3D environment can include space jump icons that enable a user to select (using a controller) a jump icon to jump to different locations within the 3D environment, as an alternate option to virtually walking through the target 3D environment by walking in the real physical environment or by accessing movement controllers of the user device.

An updated content of the target 3D environment is determined (332). The updated content of the target 3D environment can include a filtered target 3D environment generated by the server system. The filtering process can include object identification using depth maps and colored images, object classification to differentiate between structural features (e.g., walls, windows, entryways), fixed features (lighting fixtures, major kitchen appliances, window treatments, etc.), and removable features (e.g., pieces of furniture and décor) of the 3D environment. The filtering process can include removal of objects identified as removable features and reconstruction of structural features and fixed features that were previously covered by the removable features. The updated content of the target 3D environment can include a styled target 3D environment generated by the server system. The styling process can include adding (as masks) objects corresponding to one or more selected styles that are compatible with the target 3D environment to the filtered target 3D environment. The updated content of the target 3D environment can include a highlighted mode to emphasize the upgrades included in the target 3D environment. The updated content of the target 3D environment can correspond to new location data, such that the generated scene can be perceived as being seen from a new location, height, and/or angle.

The updated content of the target 3D environment is displayed on both of user device and the secondary user device (334). The updated content of the target 3D environment can be displayed in a highlighted mode. The highlights can be displayed around fixed features and/or removable features of the room of the 3D environment. In some implementations, different highlight styles (e.g., colors, width, intensity, luminosity, etc.) can be applied to differentiate between existent upgrades and/or or available upgrades.

A user input is received indicating an acceptance or rejection of one or more optional upgrades on any of the user device and the secondary user device (336). In some implementation, the user device can be configured to enable a user can select a highlighted removable feature to discard an optional available upgrade. In some implementation, a value label is displayed near the upgrade icon, the value label presenting a total value of all selected (non-discarded) available upgrades.

Each acceptance or rejection of the one or more optional upgrades is propagated between the user device and the secondary user device to enable visibility of options and communication between devices (338). In some implementation, the total value of all selected (non-discarded) available upgrades is updated on the display of each of the user device and the secondary user device. In some implementations, the display of each of the user device and the secondary user device provides an option to the user of the device to request execution of a service including the updated upgrades of the 3D environment (340). For example, a user can request to initiate a purchasing process of the property corresponding to the visualized 3D environment including the accepted upgrades.

The process 320 being at least partially repeated to determine an updated content (332) and display the updated content (334) in a manner that improves communication between the users of the user device and the secondary user device. In some implementations, when a user completes the process 320, the user can be provided with an option to store the updated content of the target 3D environment for revisiting at a later time, for comparison with other 3D environments or for performing an associated process (e.g., a message transmission of a confirmation of the purchase of the viewed property using the total value of the selected upgrades).

Having thus described several aspects of some implementations, it is to be appreciated that various alterations, modifications, and improvements will readily occur to those skilled in the art.

As one example, implementations are described in connection with an augmented (AR) environment. It should be appreciated that some or all of the techniques described herein can be applied in an MR environment or more generally in other XR environments, and in VR environments.

As another example, implementations are described in connection with devices, such as wearable devices. It should be appreciated that some or all of the techniques described herein can be implemented via networks (such as cloud), discrete applications, and/or any suitable combinations of devices, networks, and discrete applications.

This specification uses the term "configured" in connection with systems and computer program components. For a system of one or more computers to be configured to perform particular operations or actions means that the system has installed on its software, firmware, hardware, or a combination of them that in operation cause the system to perform the operations or actions. For one or more computer programs to be configured to perform particular operations or actions means that the one or more programs include instructions that, when executed by a data processing apparatus, cause the apparatus to perform the operations or actions.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non-transitory computer readable storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which can be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Implementations of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what can be claimed, but rather as descriptions of features that can be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features can be described above as acting in certain combinations and even initially be claimed as such, one or more features from a claimed combination can in some cases be excised from the combination, and the claimed combination can be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing can be advantageous.

What is claimed is:

1. A computer-implemented method comprising:
receiving, by one or more processors, a request to display a target three-dimensional environment in a virtual reality system;
generating, by the one or more processors, an image of a scene of the target three-dimensional environment, wherein the image comprises a plurality of features distributed within the scene of the target three-dimensional environment according to a distance from a viewing point of the scene of the target three-dimensional environment;
receiving, by the one or more processors, a request to display a modified image of the scene of the target three-dimensional environment;
retrieving, by the one or more processors, auxiliary data associated with the plurality of features;
generating, by the one or more processors, the modified image of the scene of the target three-dimensional environment, wherein the modified image comprises the adjusted auxiliary data associated with the plurality of features adjusted relative to the distance from the viewing point of the scene of the target three-dimensional environment to each of the plurality of features;
determining, by the one or more processors, adjusted auxiliary data by adjusting one or more characteristics of the auxiliary data based on an updated distance from an updated viewing point of the scene of the target three-dimensional environment to each of the plurality of features;
generating, by the one or more processors, an adjusted modified image of the scene of the target three-dimensional environment, wherein the adjusted modified image comprises the adjusted auxiliary data; and
providing, by the one or more processors, as output for display the adjusted modified image of the scene of the target three-dimensional environment.

2. The computer-implemented method of claim 1, wherein the auxiliary data comprises a highlight of a respective feature comprising an upgraded feature or a potentially upgradable feature.

3. The computer-implemented method of claim 2, wherein the highlight comprises a strip surrounding the respective feature.

4. The computer-implemented method of claim 1, wherein the auxiliary data comprises a color-coded layer of a respective feature indicating a lifespan of the respective feature.

5. The computer-implemented method of claim 4, wherein the color-coded layer comprises a 3-D object mask of the respective feature.

6. The computer-implemented method of claim 1, further comprising:
receiving, by the one or more processors, an updated location request; and
determining, by the one or more processors, an updated distance from an updated viewing point of the scene of the target three-dimensional environment to each of the plurality of features.

7. A non-transitory, computer-readable medium storing one or more instructions executable by a computer system to perform operations comprising:
receiving a request to display a target three-dimensional environment in a virtual reality system;
generating an image of a scene of the target three-dimensional environment, wherein the image comprises a plurality of features distributed within the scene of the target three-dimensional environment according to a distance from a viewing point of the scene of the target three-dimensional environment;
receiving a request to display a modified image of the scene of the target three-dimensional environment;
retrieving auxiliary data associated with the plurality of features;
generating the modified image of the scene of the target three-dimensional environment, wherein the modified image comprises the adjusted auxiliary data associated with the plurality of features adjusted relative to the distance from the viewing point of the scene of the target three-dimensional environment to each of the plurality of features;
determining adjusted auxiliary data by adjusting one or more characteristics of the auxiliary data based on an updated distance from an updated viewing point of the scene of the target three-dimensional environment to each of the plurality of features;
generating an adjusted modified image of the scene of the target three-dimensional environment, wherein the adjusted modified image comprises the adjusted auxiliary data; and
providing, by the one or more processors, as output for display the adjusted modified image of the scene of the target three-dimensional environment.

8. The non-transitory, computer-readable medium of claim 7, wherein the auxiliary data comprises a highlight of a respective feature comprising an upgraded feature or a potentially upgradable feature.

9. The non-transitory, computer-readable medium of claim 8, wherein the highlight comprises a strip surrounding the respective feature.

10. The non-transitory, computer-readable medium of claim 7, wherein the auxiliary data comprises a color-coded layer of a respective feature indicating a lifespan of the respective feature.

11. The non-transitory, computer-readable medium of claim 10, wherein the color-coded layer comprises a 3-D object mask of the respective feature.

12. The non-transitory, computer-readable medium of claim 7, wherein the operations further comprise:
receiving an updated location request; and
determining an updated distance from an updated viewing point of the scene of the target three-dimensional environment to each of the plurality of features.

13. A computer-implemented system comprising:
one or more computers; and
one or more computer memory devices interoperably coupled with the one or more computers and having tangible, non-transitory, machine-readable media storing one or more instructions that, when executed by the one or more computers, perform operations comprising:
receiving a request to display a target three-dimensional environment in a virtual reality system,
generating an image of a scene of the target three-dimensional environment, wherein the image comprises a plurality of features distributed within the scene of the target three-dimensional environment according to a distance from a viewing point of the scene of the target three-dimensional environment, receiving a request to display a modified image of the scene of the target three-dimensional environment, retrieving auxiliary data associated with the plurality of features;

generating the modified image of the scene of the target three-dimensional environment, wherein the modified image comprises the adjusted auxiliary data associated with the plurality of features adjusted relative to the distance from the viewing point of the scene of the target three-dimensional environment to each of the plurality of features;

determining adjusted auxiliary data by adjusting one or more characteristics of the auxiliary data based on an updated distance from an updated viewing point of the scene of the target three-dimensional environment to each of the plurality of features;

generating an adjusted modified image of the scene of the target three-dimensional environment, wherein the adjusted modified image comprises the adjusted auxiliary data; and providing, by the one or more processors, as output for display the adjusted modified image of the scene of the target three-dimensional environment.

14. The computer-implemented system of claim 13, wherein the auxiliary data comprises a highlight of a respective feature comprising an upgraded feature or a potentially upgradable feature.

15. The computer-implemented system of claim 14, wherein the highlight comprises a strip surrounding the respective feature.

16. The computer-implemented system of claim 13, wherein the auxiliary data comprises a color-coded layer of a respective feature indicating a lifespan of the respective feature.

17. The computer-implemented system of claim 16, wherein the color-coded layer comprises a 3-D object mask of the respective feature.

18. The computer-implemented system of claim 13, further comprising:

receiving an updated location request; and determining an updated distance from an updated viewing point of the scene of the target three-dimensional environment to each of the plurality of features.

* * * * *